United States Patent
Denys

(10) Patent No.: US 8,505,696 B2
(45) Date of Patent: Aug. 13, 2013

(54) BRAKE SHIM AND METHOD THEREOF

(75) Inventor: Eric Denys, Ann Arbor, MI (US)

(73) Assignee: Material Sciences Corporation, Elk Grove Village, IL (US)

(*) Notice: Subject to any disclaimer, the term of this patent is extended or adjusted under 35 U.S.C. 154(b) by 1038 days.

(21) Appl. No.: 11/771,421

(22) Filed: Jun. 29, 2007

(65) Prior Publication Data

US 2009/0000893 A1   Jan. 1, 2009

(51) Int. Cl.
*F16D 65/38*   (2006.01)
*F16D 65/00*   (2006.01)

(52) U.S. Cl.
USPC ............... 188/73.36; 188/196 V; 188/250 E

(58) Field of Classification Search
USPC ......... 267/165, 164, 161; 188/196 V, 250 B, 188/250 E, 73.35, 73.37, 73.36, 205 G, 372
See application file for complete search history.

(56) References Cited

U.S. PATENT DOCUMENTS

| | | | |
|---|---|---|---|
| 1,917,926 A * | 7/1933 | Decker ........................ 384/39 |
| 2,380,900 A * | 7/1945 | Wellman ................. 192/107 C |
| 4,467,897 A | 8/1984 | Kubo | |
| 4,535,874 A * | 8/1985 | Pollinger et al. ............ 188/73.1 |
| 4,537,289 A | 8/1985 | VonGrunberg | |
| 5,222,718 A * | 6/1993 | Buck ........................... 267/162 |
| 5,518,088 A | 5/1996 | Brosilow | |
| 5,706,917 A | 1/1998 | Matsuzaki | |
| 6,062,364 A * | 5/2000 | Kajitani et al. ............ 192/70.16 |
| 6,499,569 B1 | 12/2002 | Beggs et al. | |
| 6,758,465 B1 * | 7/2004 | Greenhill et al. ............ 267/166 |
| 2004/0163903 A1 * | 8/2004 | Saka ........................ 188/250 G |
| 2006/0289255 A1 * | 12/2006 | Adams .................... 188/218 XL |

* cited by examiner

*Primary Examiner* — Anna Momper
(74) *Attorney, Agent, or Firm* — Quinn Law Group, PLLC

(57) ABSTRACT

Provided is a shim structure adapted to be interposed between a friction member and a forcing member configured to urge the friction member against a rotating member of a brake system. The shim structure includes a sheet member having opposing first and second surfaces defining a substantially uniform thickness of sufficient magnitude to not deform during urging of the friction member. There is no viscoelastic layer on the first or second surfaces. The first and second surfaces also define a waveform cross-section having an amplitude and a wavelength extending substantially the entire length of the sheet member; the amplitude and wavelength are of sufficient ratio to provide selective noise and vibration damping, isolation, and thermal dissipation for the brake system. Additionally, the amplitude and wavelength are configured to be variably tunable, providing different predetermined levels of noise and vibration absorption and attenuation. The wave-form cross-section is preferably sinusoidal.

14 Claims, 2 Drawing Sheets

BRAKE SHIM AND METHOD THEREOF

TECHNICAL FIELD

The present invention relates to shim devices used in brake systems for dampening brake noise, minimizing system vibration, and improving heat dissipation characteristics, and methods for using the same.

BACKGROUND OF THE INVENTION

Most conventional motor vehicles are equipped with a brake system for selectively slowing or stopping movement of the vehicle in a controlled manner. Modern automotive braking systems may be grouped into two basic categories, disc brakes and drum brakes. A typical brake system may include a disc brake assembly for each of the front wheels and either a drum brake assembly or a disc brake assembly for each of the rear wheels. Regardless of type, brake assemblies are normally actuated by hydraulic, pneumatic, or mechanical pressure generated by an operator of the vehicle by, for example, depressing a foot pedal, pulling a hand lever, and like methods.

The primary components of a conventional disc brake assembly are the rotor or disc, caliper, one or more pistons, and two or more brake pads (also known as brake linings). The brake pads have a frictional lining supported by a rigid backing plate. The rotor is typically mounted so as to rotate with the axle of the wheel to be braked, configured to transmit braking forces from the caliper assembly to the wheel.

The caliper assembly, which houses the friction pads and pistons, is either solidly attached (fixed-type) or slidably mounted (floating-type) to a stationary, non-rotatable component of the vehicle, such as the vehicle frame. The piston(s), traditionally having a circular transverse cross-section, is slidably received in a cylinder bore of the caliper such that the centerline of the piston is parallel to the axis of rotation of the rotor. Through the application of pressure, whether it be hydraulic, mechanical, or pneumatic, the piston is forced to translate and, in so doing, to urge the brake pad(s) against a surface of the disc rotor, to thereby oppose and restrain rotational movement of the disc rotor through mechanical friction.

During a braking application, the brake pad and rotor may vibrate and generate a high-pitched brake noise, referred to in the art as "brake squeal". For example, when the friction material of the brake pad contacts the rotor or drum of a brake assembly unevenly, the coupling causes the pad and rotor/drum to oscillate and vibrate (known as "force-coupled excitation".) Additionally, as the brake assembly components heat up, the rotor may develop hot spots. The hot spots can cause the rotor to have regions of varying depth and friction, producing inconsistent levels of brake torque, and potentially exacerbating the aforementioned brake squeal.

Brake squeal is generally unappealing and unpleasant to vehicle occupants, pedestrians, etc., especially as vehicles are designed to be more comfortable and quieter. Hence, vehicle noise, vibration and harshness (NVH) is an important priority for today's original equipment vehicle manufacturers (OEM).

Efforts have been made to remedy or at least alleviate brake squeal. Some simple techniques like beveling or chamfering the linings, greasing the contact portion between the caliper and the linings, increasing the density of the backing plate, etc. help reduce squeal. Another approach to reducing or preventing "brake squeal" is to use a brake pad shim, which is interposed between the piston and backing plate of the brake pad in order to attenuate or reduce the magnitude of vibrations (resonance instability) of the brake pad and the disc rotor.

Brake shims control noise in three primary ways. First, they prevent and reduce the transmission and amplitude of vibrational forces that cause excitation of the caliper, pad assembly, and attached structure. This is traditionally accomplished by a viscoelastic damping material within the layering construction of the shims and/or through the bonding of the shim to the pad assembly. Second, shims add mass, even if minimally, to the brake linings which, in turn, dampens vibrations and oscillations by reducing reaction forces transmitted back into the brake piston using elastomer interface coatings on their surface. Finally, the brake shim can act as a thermal barrier to ensure consistent temperatures across the entire face of the pad, minimizing rotor hot spots and uneven lining wear, and providing a more uniform brake torque.

SUMMARY OF THE INVENTION

Provided herein are shim structures for use with motor vehicle brake assemblies. The shim structures described below are adapted to be interposed between a friction member and a forcing member of a brake system, the forcing member being operable to urge the friction member against a rotating member configured to distribute braking forces to a vehicle wheel. The shim structures described hereinbelow provide high temperature durability, superior thermal dissipation characteristics, and competitive sound damping performance without the necessity of additional viscoelastic layers. In addition, the shim structures provided herein also offer improved isolation during braking and the ability to be adapted for different braking pressures and for implementation into various braking applications.

The shim structures described herein include a sheet member having substantially opposing first and second surfaces defining a substantially uniform sheet member thickness. The sheet member is preferably made from a high temperature tempered metallic material. The sheet member thickness is of sufficient magnitude so as to not permanently deform during a single braking operation (e.g., urging of the friction member against the rotating member) or throughout its operational life expectancy. The first and second surfaces also define a waveform cross-section having an amplitude and a wavelength extending substantially the entire length of the sheet member. The amplitude and wavelength are of sufficient ratio to provide selective damping, isolation, and thermal dissipation for the brake system during urging of the friction member.

According to a preferred embodiment of the present invention, the first and second surfaces are characterized by an absence of a viscoelastic layer disposed thereon. Moreover, the cross-section amplitude and wavelength are configured to be variably tunable to thereby provide different predetermined levels of noise and vibration absorption and attenuation. It is further preferred that the first and second surfaces define a sinusoidal waveform cross-section. Finally, the length of the shim structure will preferably extend orthogonally relative to an axis of rotation of the rotational member.

According to an alternate embodiment, the first and second surfaces define a saw-tooth waveform cross-section.

According to another alternate embodiment, the first and second surfaces define a triangular waveform cross-section.

Also provided herein is an improved method for frictional damping and isolation in a brake system. The brake system includes a forcing member configured to frictionally engage a friction member with a rotating member. The method comprises the step of interposing an uncoated wavy sheet member between the friction member and forcing member, whereby to provide frictional damping without coating the wavy sheet member. The method preferably also includes the step of tuning various characteristics of the wavy member for different forcing pressures by the forcing member before interposing the uncoated wavy member between the friction member and forcing member. The tunable characteristics include a thickness, wavelength and stiffness.

The above features and advantages, and other features and advantages of the present invention, will be readily apparent from the following detailed description of the preferred embodiments and best modes for carrying out the present invention when taken in connection with the accompanying drawings.

DESCRIPTION OF THE PREFERRED EMBODIMENTS

Figure 1:
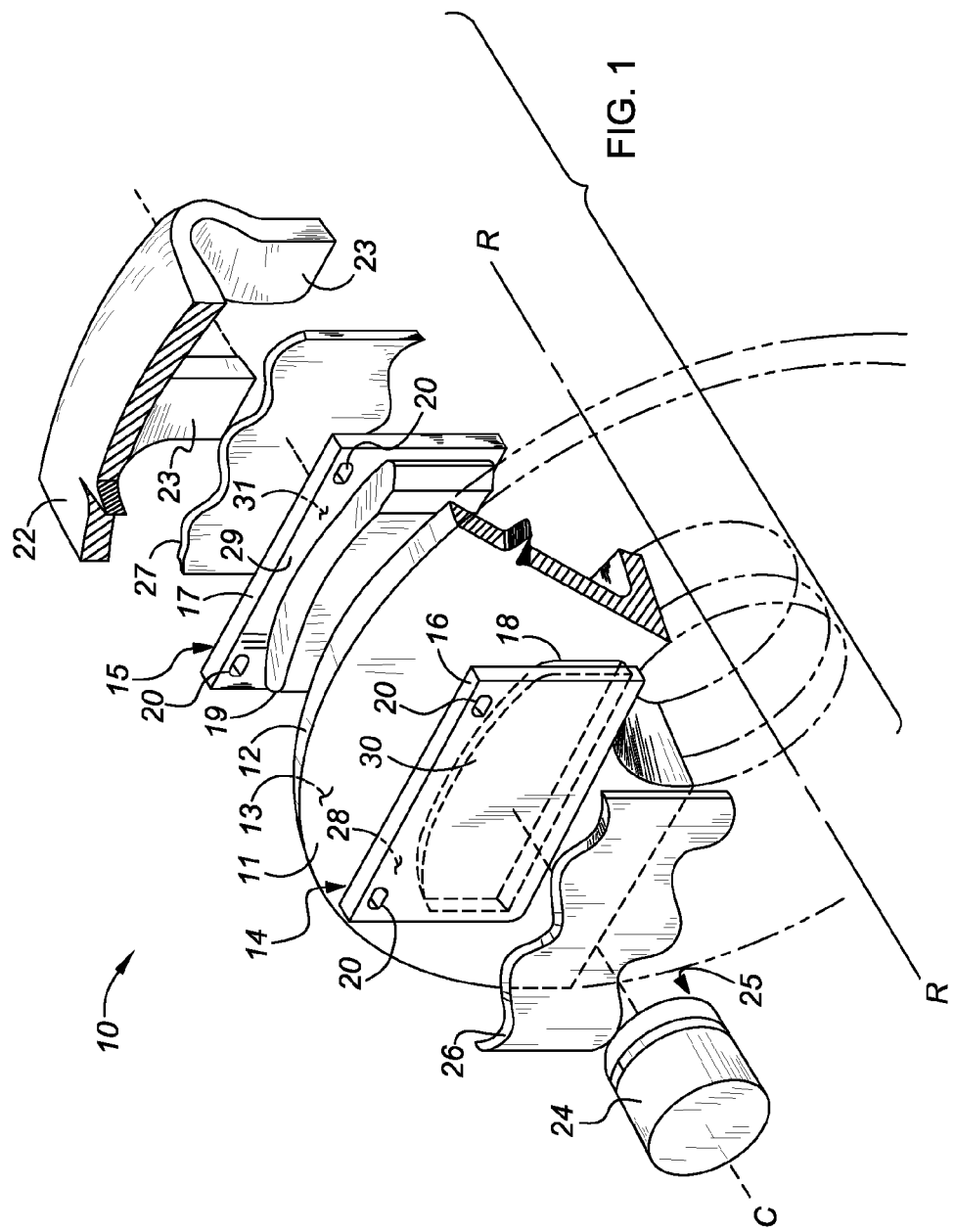
FIG. 1 is an exploded, isometric view of a disc brake assembly having a rotor, a housing, a piston, brake linings, and brake shims in accordance with the present invention.

Referring to the Figures, wherein like reference numbers refer to the same or similar components throughout the several views, FIG. 1 is an exploded, isometric view of a disc brake assembly, identified generally as 10, in accordance with the present invention. The disc brake assembly 10 is illustrated in FIG. 1 as single-piston, floating-type caliper. However, the present invention may be applied to multiple-piston brake assemblies and fixed-type calipers, without departing from the inventive concept described herein. In addition, the application of FIG. 1—wherein the present invention is illustrated for attenuating noise and vibration in a disc brake assembly, and for providing isolation (decoupling) and heat dissipation, is purely exemplary. Accordingly, the present invention can also be incorporated into a drum brake assembly (not shown) between the drum brake shoe and drum brake backing plate to damp the noise and vibration produced in the drum brake assembly, and for providing isolation and heat dissipation therein.

The disc brake assembly 10 of FIG. 1 includes one or more friction members, defined herein by first and second brake pads 14, 15, respectively, each disposed on a respective side of a rotating member, such as rotor 12. The rotor 12 is rotatably mounted with the axle of a vehicle wheel (not shown), and configured to transmit braking forces from the disc brake assembly 10 to the wheel. The first and second brake pads 14, 15 each include a respective backing plate 16, 17 of sufficient rigidity to support a frictional lining 18, 19 correspondingly mounted on the backing plate face 28, 29 proximate to the rotor 12. The frictional lining 18, 19 is the element of the brake pads 14, 15 that contacts the rotor 12 to provide the frictional force necessary to slow the vehicle (not shown), as will be discussed in detail below. The first and second brake pads 14, 15 are slidably supported, e.g., via pins (not shown) which extend through identical openings 20 in the upper left- and right-extents of each backing plate 16, 17 and affix to a caliper housing, shown in FIG. 1 in partial cross-section as 22.

In operation, the first and second brake pads 14, 15 are collaboratively urged towards one another, coaxially translating along a centerline C, by piston 24 and housing tabs 23, respectively. The piston 24 is slidably received in a cylinder bore (not shown) of the caliper housing 22 such that the centerline C of the piston 24 (and brake pads 14, 15) is parallel to the axis of rotation R of the rotor 12. The piston 24 can be actuated by mechanical, hydraulic, or pneumatic pressure, or by electromechanical force (i.e., in an electronic braking system.) The force of the piston 24 presses the linings 18, 19 of each of the respective brake pads 14, 15 into frictional engagement with respective contact surfaces 11, 13 of the rotor 12. In other words, the transverse load of the piston 24 is transmitted as mechanical friction to the rotor surfaces 11, 13 via the first and second brake pads 14, 15, thereby opposing rotation of the rotor 12. In turn, the rotor 12 transmits the braking force from the disc brake assembly 10 to the wheel (not shown) in order to selectively slow or stop the vehicle (not shown) in a controlled manner.

Also included in the disc brake assembly 10 are one or more brake insulators/dampers, defined herein by a first shim 26 interposed between the first brake pad 14 and the piston 24, and a second shim 27 interposed between the second brake pad 15 and the caliper housing 22. According to the embodiment of FIG. 1, the first shim 26 is disposed between, and coaxially aligned with an apply face 25 of the piston 24 and the face 30 of the backing plate 16 distal from the rotor 12. In a similar regard, the second shim 27 is disposed between, and coaxially aligned with the housing tabs 23 of the caliper housing 22 and the face 31 of the backing plate 17 distal from the rotor 12. As described more clearly below, the first and second shims 26, 27 are provided, in part, to reduce and/or eliminate undesired vibration and brake squeal noise during a braking application (i.e., actuation of the piston 24 to frictionally engage the first and second brake pads 14, 15 with the rotor 12) and provide for improved isolation and thermal dissipation. Although not shown herein, the first and second shims 26, 27 can include one or more sets of claws or grips configured to interface with and more firmly fasten the first and second shims 26, 27 to their respective counterparts (e.g., the first and second brake pads 14, 15 and/or piston 24 and housing tabs 23, respectively).

Figure 2A:
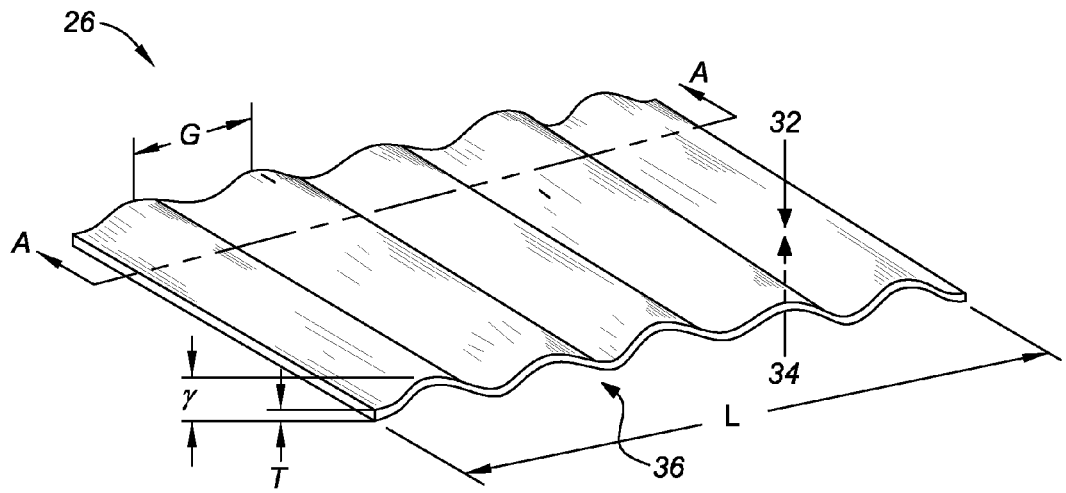
FIG. 2a is a perspective view of one of the brake shims of FIG. 1.

Looking now to FIG. 2a, an isometric, perspective view of the first shim 26 of FIG. 1 is provided. Although positioned differently in FIG. 1, the structures of the first and second shims 26, 27 are identical; thus, for reasons of brevity, the first and second shims 26, 27 will both be described with regards to the first shim 26 only (hereinafter referred to as the "shim structure").

According to a preferred embodiment illustrated in FIG. 2a, the shim structure 26 is essentially a single plate member having a first surface 32 substantially opposing a second surface 34. Ideally, the shim structure 26 is a unitary, preformed, substantially-rectangular, non-flat plate. It is further preferred that the shim structure 26 is fabricated from a material known to have a suitable strength for its intended use, e.g., cold rolled steel, hot dipped galvanized steel, stainless steel, aluminum, and the like, and may be finished with an anti-corrosive, aesthetically appealing highly durable coating (i.e., dichromate paint, zinc plating, etc., not shown.) It is also within the scope of the present invention that the shim structure 26 take on additional shapes (e.g., a polygon, hexagon, etc.), include rounded or beveled edges or corners, and have varying cross sections, as will be described below.

Ideally, the first and second surfaces 32, 34 of the shim structure 26 are characterized by a complete absence of a viscoelastic or rubber coating or layer thereon. Conventional viscoelastic layers used in prior art brake shims are made up of organic materials with inherently limited thermal durability (i.e., will begin to degrade or decompose at certain temperatures/pressures). By eliminating organic materials from the first and second faces 32, 34, the shim structure 26 is able to maintain predetermined levels of isolation, damping, and durability at extreme operating temperatures. Consequently, the shim structure 26 can be applied across a large variety of vehicle platforms requiring varying operating ranges (e.g., from compact passenger cars to commercial trucks and busses).

The first and second surfaces 32, 34 of the shim structure 26 define a substantially uniform thickness T spanning substantially the entire length L of the shim structure 26. The thickness T of the shim structure 26 is of sufficient magnitude so as to not permanently deform during a single brake application or throughout the operational life expectancy of the shim structure 26. Preferably, the thickness T is between 0.3 and 1.5 mm.

Figure 2B:
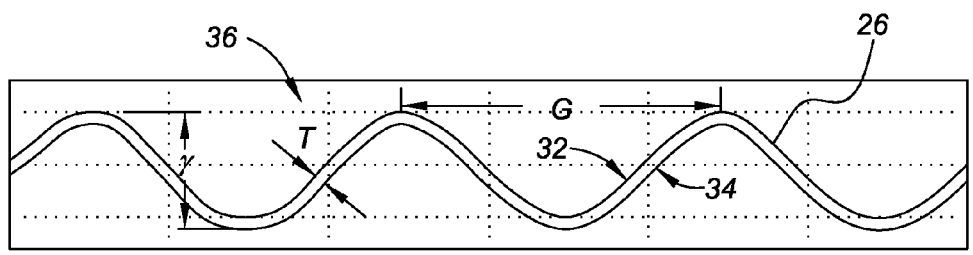
FIG. 2b is a cross-sectional view, taken along the line A-A of FIG. 2a, of the brake shim of FIG. 1.

Still referring to FIG. 2a, the first and second surfaces 32, 34 of the shim structure 26 also define a waveform cross-section, identified generally as 36 and best seen in FIG. 2b. As used herein, the term "waveform" should be defined or interpreted to mean a repeating, propagating geometric shape having a plurality of peaks and valleys. To this regard, the waveform cross-section 36 has an amplitude $\gamma$ (often referred to in the art as the peak-to-peak amplitude) and a wavelength G. The amplitude $\gamma$ is the sum-total magnitude of propagation of the waveform cross-section 36. In other words, the amplitude $\gamma$ is a metric representing the distance from peak to valley in a single propagation of the waveform cross-section 36. The wavelength G, as shown in FIG. 2a, is the distance between repeating units of the waveform cross-section. Put another way, the wavelength G is the distance between two peaks or two valleys in the waveform cross-section 36. The ratio of amplitude $\gamma$ to wavelength G is of sufficient magnitude to provide a predetermined minimum level of noise damping, system isolation, and thermal dissipation for a brake system (such as disk brake assembly 10 of FIG. 1) during a single braking operation and during the operational life expectancy of the shim structure 26. To this regard, it is preferred that the wavelength G is between 5 and 15 mm, and the amplitude $\gamma$ is between 0.4 and 2.5 mm.

The characteristics of the shim structure 26, e.g., thickness, wavelength, and amplitude, are tunable for different braking systems and different braking pressures. For instance, when the shim structure 26 is pressurized (e.g., during a braking operation) it will compress/deform in order to provide frictional damping and isolation. For that reason, the ratio of amplitude $\gamma$ to wavelength G can be selectively modified to vary the magnitude of deformation of the shim structure 26, and thus vary the amount of frictional damping and the degree of isolation. In addition, if the brake pressure at which brake squeal is occurring in a certain system can be identified, the ratio of amplitude $\gamma$ to wavelength G can be selectively modified to optimize isolation and friction at that particular pressure to more efficiently absorb and eliminate vibration and noise for that system.

Referring now to FIG. 2a, a cross-sectional view, taken along the line A-A of FIG. 2a, of the shim structure 26 is provided illustrating the cross-section 36 as a sinusoidal waveform.

Figure 3:
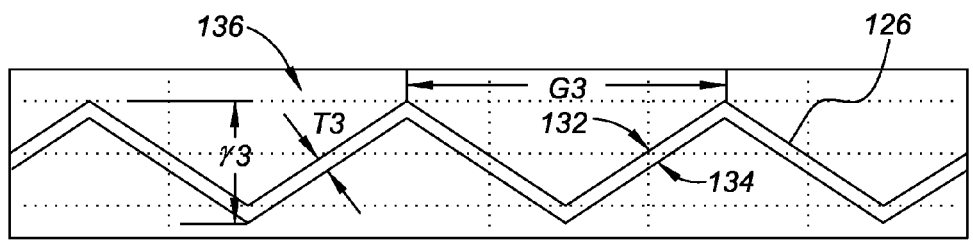
FIG. 3 is a cross-sectional view of the brake shim of FIG. 2 according to an alternate embodiment of the present invention.

Referring now to FIG. 3, there is shown an alternate embodiment of the present invention, illustrating a shim structure 126 having first and second surfaces 132, 134, respectively, defining a substantially uniform thickness T3 and a waveform cross-section 136 having an amplitude $\gamma 3$ and wavelength G3. Unless otherwise noted, the embodiment provided in FIG. 3 is functionally and structurally equivalent to that of FIG. 1. For instance, similar to the embodiment of FIGS. 2a-2b, the first and second surfaces 132, 134 of the shim structure 126 of FIG. 3 are characterized by a complete absence of a viscoelastic or rubber coating or layer thereon.

The sole distinction between the embodiment of FIGS. 2a-2b and the alternate embodiment illustrated in FIG. 3 is that the cross-section 136 of the shim structure 126 is a triangle waveform. Regardless of the differing geometric shapes, the characteristics of the shim structure 126 of FIG. 3 (e.g., thickness T3, amplitude $\gamma 3$ and wavelength G3) is tunable and adaptable in the same manner as the shim structure 26 of FIG. 1, thereby providing high temperature durability, superior thermal dissipation characteristics, and competitive sound damping performance without the cost of additional viscoelastic layers, in addition to improved isolation during braking and the ability to be adapted for different braking pressures and for implementation into different braking applications.

Figure 4:
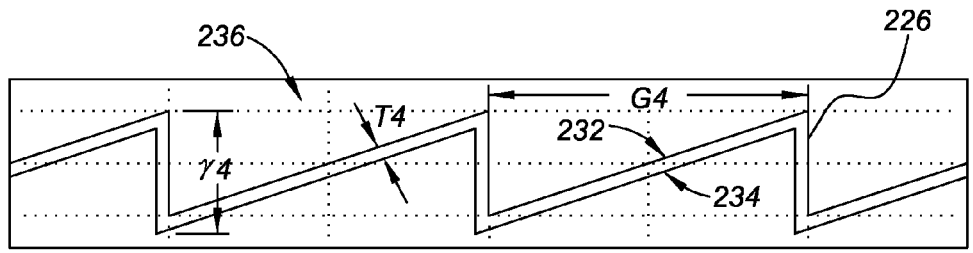
FIG. 4 is a cross-sectional view of the brake shim of FIG. 2 according to another alternate embodiment of the present invention.

Referring now to FIG. 4, there is shown yet another embodiment of the present invention, illustrating a shim structure 226 having first and second surfaces 232, 234, respectively, defining a substantially uniform thickness T4 and a waveform cross-section 236 having an amplitude $\gamma 4$ and wavelength G4. Unless otherwise noted, the embodiment provided in FIG. 4 is functionally and structurally equivalent to that of FIG. 1. For instance, the first and second surfaces 232, 234 of the shim structure 226 are characterized by a complete absence of a viscoelastic or rubber coating or layer thereon.

The sole distinction between the embodiments of FIGS. 2a-2b and 3 and the alternate embodiment illustrated in FIG. 4 is that the cross-section 236 of the shim structure 226 is a sawtooth waveform. Regardless of the differing geometric shapes, the characteristics of the shim structure 226 of FIG. 4 (e.g., thickness T4, amplitude $\gamma 4$ and wavelength G4) is tunable and adaptable in the same manner as the shim structure 26 of FIG. 1, thereby providing high temperature durability, superior thermal dissipation characteristics, and competitive sound damping performance without the cost of additional viscoelastic layers, in addition to improved isolation during braking and the ability to be adapted for different braking pressures and for implementation into different braking applications.

While the best modes for carrying out the present invention have been described in detail, those familiar with the art to which this invention relates will recognize various alternative designs and embodiments for practicing the invention within the scope of the appended claims.

The invention claimed is:
1. A brake assembly comprising:
a friction member;
a forcing member that is configured to urge the friction member against another member of the assembly;
a unitary sheet member having a first surface substantially opposing a second surface, the sheet member being interposed between the friction member and the forcing member;
wherein said first and second surfaces define a substantially-rectangular, non-flat plate with a substantially uniform thickness, said first and second surfaces further defining a sinusoidal waveform cross-section having an amplitude and a wavelength extending substantially the entire length of said sheet member;

wherein said sheet member is composed of one of a cold rolled steel, hot dipped galvanized steel, stainless steel and aluminum;

wherein said waveform cross-section is a repeating, propagating geometric shape having a plurality of peaks and valleys;

wherein said thickness is of sufficient magnitude so as to not permanently deform during urging of the friction member against the another member;

wherein said thickness is between 0.3 and 1.5 mm; and wherein said amplitude is between 0.4 and 2.5 mm and said wavelength is between 5 and 15 mm to provide selective damping, isolation, and thermal dissipation for the brake system during urging of the friction member against the another member.

2. The brake assembly of claim 1, wherein said amplitude and wavelength are configured to be variably tunable to thereby provide different predetermined levels of noise and vibration absorption and attenuation.

3. The brake assembly of claim 2, wherein said sheet member is made from a high temperature tempered metallic material.

4. The brake assembly of claim 3, wherein the length of said sheet member extends orthogonally relative to an axis of rotation of the another member.

5. The brake assembly of claim 1, wherein said sheet member is a nonporous plate.

6. The brake assembly of claim 1, wherein said sheet member is characterized by an absence of a viscoelastic layer.

7. The brake assembly of claim 1, further comprising:

a backing plate operatively connected to said sheet member, said backing plate being substantially flat along an entire length and an entire width of said backing plate; and wherein said sheet member defines a length that is substantially the same as said length of said backing plate.

8. A brake assembly for a motorized vehicle having at least one wheel, the brake assembly comprising:

a rotating member rotatably mounted with respect to the at least one wheel and operable to transmit braking forces thereto;

a housing member operatively mounted proximate to said rotating member;

at least one friction member operatively disposed within said housing member and configured to frictionally engage said rotating member;

an urging member operatively disposed within said housing member and configured to selectively effect the frictional engagement between said at least one friction member and said rotating member;

a shim member interposed between said at least one friction member and said urging member, wherein said shim member is a unitary sheet member having a substantially-rectangular, non-flat plate with a first surface substantially opposing a second surface, said first and second surfaces defining a sinusoidal waveform cross-section having a substantially uniform thickness;

wherein said sheet member is composed of one of a cold rolled steel, hot dipped galvanized steel, stainless steel and aluminum;

wherein said waveform cross-section is a repeating, propagating geometric shape having a plurality of peaks and valleys;

wherein said thickness is of sufficient magnitude so as not to permanently deform during urging of the friction member against the rotating member;

wherein said thickness is between 0.3 and 1.5 mm; and wherein said waveform cross-section includes a selectively tunable amplitude configured to provide different predetermined levels of absorption and attenuation of induced vibrations and noise in the brake system.

9. The brake assembly of claim 8, wherein said waveform cross-section further includes a selectively tunable wavelength configured to provide different predetermined levels of absorption and attenuation of induced vibrations and noise in the brake system, and wherein said amplitude is between 0.4 and 2.5 mm and said wavelength is between 5 and 15 mm to provide selective isolation and heat dissipation for the brake system during urging of said at least one friction member.

10. The brake assembly of claim 9, wherein said waveform cross-section extends orthogonally relative to an axis rotationg of said rotational member.

11. The brake assembly of claim 10, wherein said shim member is made from a high temperature tempered metallic material.

12. The brake assembly of claim 9, wherein said sheet member is a nonporous plate.

13. The brake assembly of claim 9, wherein said shim member is characterized by an absence of a viscoelastic layer.

14. The brake assembly of claim 9, wherein said shim member is a single sheet member positioned between said friction member and said urging member.

* * * * *